United States Patent
Chou

(10) Patent No.: US 11,455,034 B2
(45) Date of Patent: Sep. 27, 2022

(54) METHOD FOR SETTING DISPLAY MODE OF DEVICE ACCORDING TO FACIAL FEATURES AND ELECTRONIC DEVICE FOR THE SAME

(71) Applicant: REALTEK SEMICONDUCTOR CORP., Hsinchu (TW)

(72) Inventor: Kai-Hsiang Chou, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 17/197,334

(22) Filed: Mar. 10, 2021

(65) Prior Publication Data
US 2021/0286428 A1 Sep. 16, 2021

(30) Foreign Application Priority Data
Mar. 11, 2020 (TW) ................. 109107925

(51) Int. Cl.
*G06F 3/01* (2006.01)
*G06F 3/14* (2006.01)
*G06V 40/19* (2022.01)
*G06V 40/16* (2022.01)

(52) U.S. Cl.
CPC ............. *G06F 3/013* (2013.01); *G06F 3/012* (2013.01); *G06F 3/14* (2013.01); *G06V 40/171* (2022.01); *G06V 40/19* (2022.01)

(58) Field of Classification Search
CPC ..... G06F 2200/1614; G06F 2200/1637; G06F 3/012; G06F 3/013; G06K 9/3208; G09G 2340/0492; G09G 2340/0464; G09G 2340/0471; G09G 2340/0478; G09G 2340/0485; G09G 2340/04
USPC .................................................. 345/649, 659
See application file for complete search history.

(56) References Cited

U.S. PATENT DOCUMENTS

| | | | |
|---|---|---|---|
| 2006/0192775 A1* | 8/2006 | Nicholson ............. | G06F 1/3203 345/211 |
| 2011/0001762 A1* | 1/2011 | Li ........................ | G06K 9/3208 345/649 |
| 2011/0032220 A1* | 2/2011 | Shih ..................... | G06K 9/3208 345/204 |
| 2011/0074822 A1* | 3/2011 | Chang ................. | G06F 3/04845 345/649 |

(Continued)

FOREIGN PATENT DOCUMENTS

| | | |
|---|---|---|
| CN | 102884803 A | 1/2013 |
| TW | 201407596 A | 2/2014 |
| TW | 201504929 A | 2/2015 |

*Primary Examiner* — Koosha Sharifi-Tafreshi
(74) *Attorney, Agent, or Firm* — Li & Cai Intellectual Property (USA) Office

(57) ABSTRACT

A method for setting a display mode of a device according to facial features and an electronic device for the same are provided. The electronic device uses a camera unit to capture a facial image of a user for identifying facial organs. Then, a relative angle of the user's eyes viewing the image can be determined. After that, a turning signal can be provided according to an angle of the user's eyes viewing the image, and the state of the device. A display unit is driven to display a landscape mode image or a portrait mode image in response to the turning signal. Alternatively, a driving mechanism of the electronic device can be controlled and the electronic device is turned to a specific angle.

3 Claims, 9 Drawing Sheets

(56) References Cited

U.S. PATENT DOCUMENTS

| | | | |
|---|---|---|---|
| 2011/0298829 A1* | 12/2011 | Stafford | G06K 9/3208 |
| | | | 345/659 |
| 2013/0100123 A1 | 4/2013 | Hakoda et al. | |
| 2014/0035808 A1 | 2/2014 | Lee et al. | |
| 2014/0078178 A1* | 3/2014 | Li | G06F 1/1694 |
| | | | 345/659 |
| 2020/0293255 A1* | 9/2020 | Lim | F16M 11/105 |
| 2021/0183343 A1* | 6/2021 | Beith | G02B 27/0179 |
| 2021/0191520 A1* | 6/2021 | Yang | G06F 3/0482 |

* cited by examiner

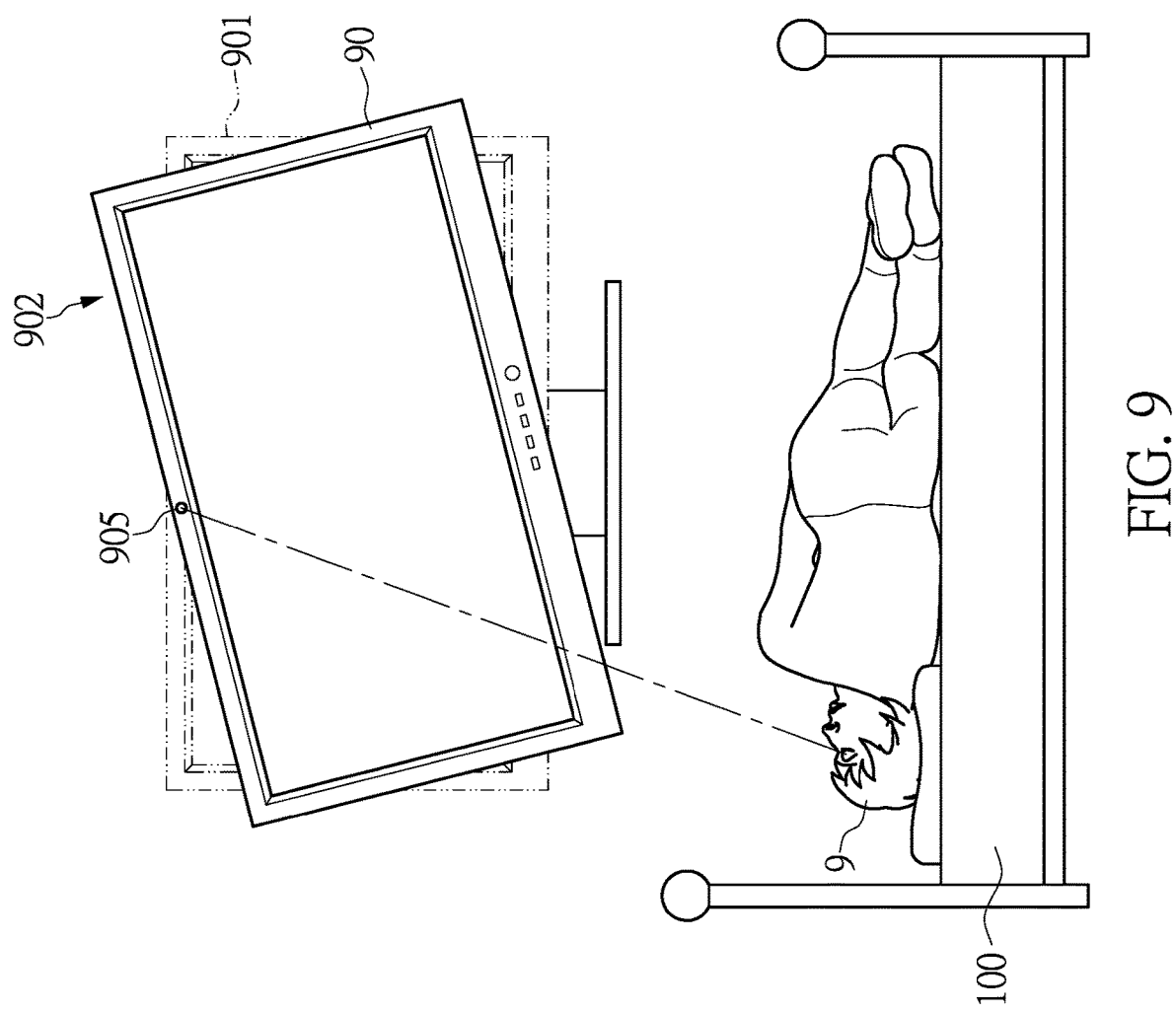

METHOD FOR SETTING DISPLAY MODE OF DEVICE ACCORDING TO FACIAL FEATURES AND ELECTRONIC DEVICE FOR THE SAME

CROSS-REFERENCE TO RELATED PATENT APPLICATION

This application claims the benefit of priority to Taiwan Patent Application No. 109107925, filed on Mar. 11, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a technology of setting a turning angle of an image displayed on an electronic device, and more particularly to a method for adjusting a turning angle of the image displayed on an electronic device according to facial features, and an electronic device performing the method.

BACKGROUND OF THE DISCLOSURE

A content displayed on a mobile device is generally viewed in portrait mode (i.e., a vertical display mode) or in landscape mode (i.e., a horizontal display mode) in accordance with a preference of a user or the image characteristics. The mobile device generally operates in the vertical display mode, for example, for viewing a vertical image, but may be turned to the horizontal display mode for watching videos.

In the conventional technology, a software program performed in the mobile device can determine the turning direction of the mobile device via a gravity sensor that can be implemented by using an accelerometer of the mobile device. The gravity sensor relies on a reference axis that is directed toward the earth's center to sense a pose of the mobile device. For example, a turning angle of the mobile device can be obtained by comparing a direction of the mobile device with the reference axis, and the turning angle is provided for a software program that controls the turning angle of the device. The software program can determine an appropriate display mode for the user to view the content based on a turning threshold.

For example, when the mobile device is placed horizontally, a software program performed in the mobile device controls a screen to automatically turn to a landscape mode according to the sensed data from a gravity sensor. Conversely, the screen is turned to a portrait mode when the mobile device is used vertically.

Nevertheless, the conventional technology still suffers from some problems if only the conventional software program is relied upon for automatically turning a display image to the vertical or horizontal state on the mobile device, and not referring to the user's pose. For example, if the software program only refers to the direction of a device, the automatic turning function operated in the device may be visually uncomfortable for the user when lying down to watch a device screen or television.

SUMMARY OF THE DISCLOSURE

In response to the above-referenced technical inadequacies, the present disclosure provides a method for setting display mode of a device according to facial features and an electronic device for the same.

For solving the problem that the conventional automatic turning function of a screen fails to meet the needs under a specific condition, a method for setting a display mode of a device according to facial features and an electronic device for performing the method are provided. The method performed in the electronic device includes determining a relative angle of seeing a display image of the electronic device through a user's eyes, and providing a turning signal according to a viewing angle of the user's eyes and a state of the display image of the electronic device.

According to one embodiment of the disclosure, a camera of the electronic device is used to capture a facial image of the user. The facial organs of the face of the user can be recognized according to the features and can be positioned so as to determine the positions of the eyes. When the positions of the eyes are obtained, a relative angle for viewing the display image of electronic device can be obtained. The state of the display image of the electronic device can be used to determine if the electronic device is turned.

The state of the display image indicates a portrait mode or a landscape mode of the electronic device, e.g., a handheld device, displaying the image when the electronic device is at an inclination angle in a three-dimensional space. The viewing angle of the user's eyes is immediately determined and is used to substitute the sensed data in the electronic device. The positions of the eyes are referred to so as to provide a turning signal. Therefore, the display image can be turned automatically according to the viewing angle of the eyes, or a prompt message is provided as an option for the user to determine if the display image is turned.

Further, in one aspect of the disclosure, when the electronic device is a fixed device, such as a television, the state of display image displayed by the electronic device indicates that the electronic device stays at a steady static state. Similarly, the display image is turned based on the viewing angle of the user's eyes.

In one further embodiment of the disclosure, the electronic device controls its turning angle by a driving mechanism. The entire electronic device can be driven to turn with an angle according to the viewing angle of the user's eyes.

In one embodiment, the electronic device is such as a mobile device or a display installed in a fixed position. The electronic device includes a processor, a display unit, an accelerometer and a camera unit. The accelerometer is used to sense the state of the electronic device. The state of the electronic device is used as a reference to determine if the image is displayed in a portrait mode or in a landscape mode. The state of the electronic device is generally used to determine a turning angle of the display image. In the method, the camera unit captures a facial image of a user. A viewing angle of the user's eyes can be determined since the organs of the face are recognized. The electronic device relies on the viewing angle of the user's eyes and the state of the display image to generate a turning signal.

In yet another aspect, the technical concept of the method of the present disclosure can also be applied to an electronic device for setting a sensor mode of a sensor of the device according to the facial features. The function of the sensor may be turned off or fail if the user is at a wrong posture. In the method, a relative angle between a direction the user's face and a device direction of the electronic device is obtained, and a turning signal can be determined according to the relative angle. The turning signal is referred to for driving the sensor to be functioned correctly under any posture of the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 9 is another schematic diagram showing another circumstance that a display mode is set for the device according to facial features in one embodiment of the disclosure.

DETAILED DESCRIPTION OF THE EXEMPLARY EMBODIMENTS

Figure 1:
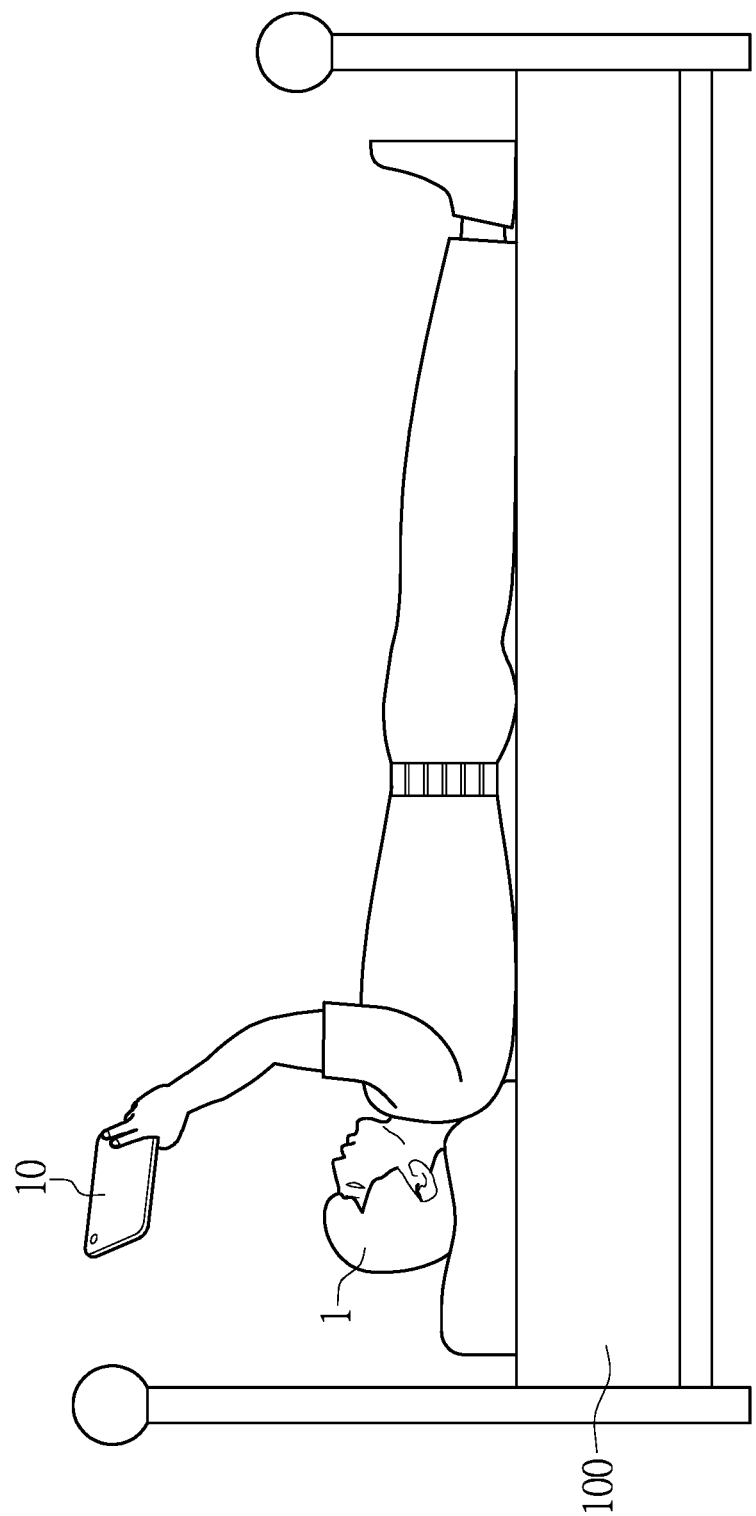
FIG. 1 is a schematic diagram showing a circumstance that a display mode is set for a device according to facial features in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In existing technologies, a software program operated in an electronic device handheld by a user is used to detect a device direction of the electronic device so as to determine whether or not an image is displayed in a portrait mode or in a landscape mode based on an attribute associated to an image or a video. The electronic device is such as a mobile phone or a tablet computer that is provided for the user to watch the image or the video. The attribute is the information recorded in metadata provided for the program to decide a display mode. An accelerometer built in the electronic device is also used to determine the device direction of the electronic device. While simultaneously referring to both the attribute associated to the image or video and the device direction of the electronic device, the image displayed on the electronic device can be turned automatically. A turning function can also be disabled when not needed. Nevertheless, an automatic turning function may not provide an appropriate way of viewing the image displayed on the electronic device when the user is in a specific posture. The method for setting a display mode of a device according to facial features and the device performing the method in the disclosure allow the user in various postures to view the image on the electronic device having appropriate turning angles. Instead of a conventional device that relies on gravity direction to determine the turning angle of the display image, the facial features act as a reference for determining the turning angle of the display image in the method of the disclosure.

Reference is made to FIG. 1, which schematically shows a circumstance that a display mode is set according to facial features. This figure shows a user 1 who holds an electronic device 10 lies in a bed 100. The electronic device 10 is equipped with the automatic turning function. However, the electronic device 10 may be improperly turned if the user 1 horizontally lies in the bed 100 and holds the electronic device 10 to watch an image since the automatic turning function only relies on a direction of gravity to control a turning direction of the electronic device 10, or the image displayed on the electronic device 10 is irregularly turned and causes bad viewing experience when an accelerometer therein continuously senses variant directions under a specific state of the device.

Figure 2:
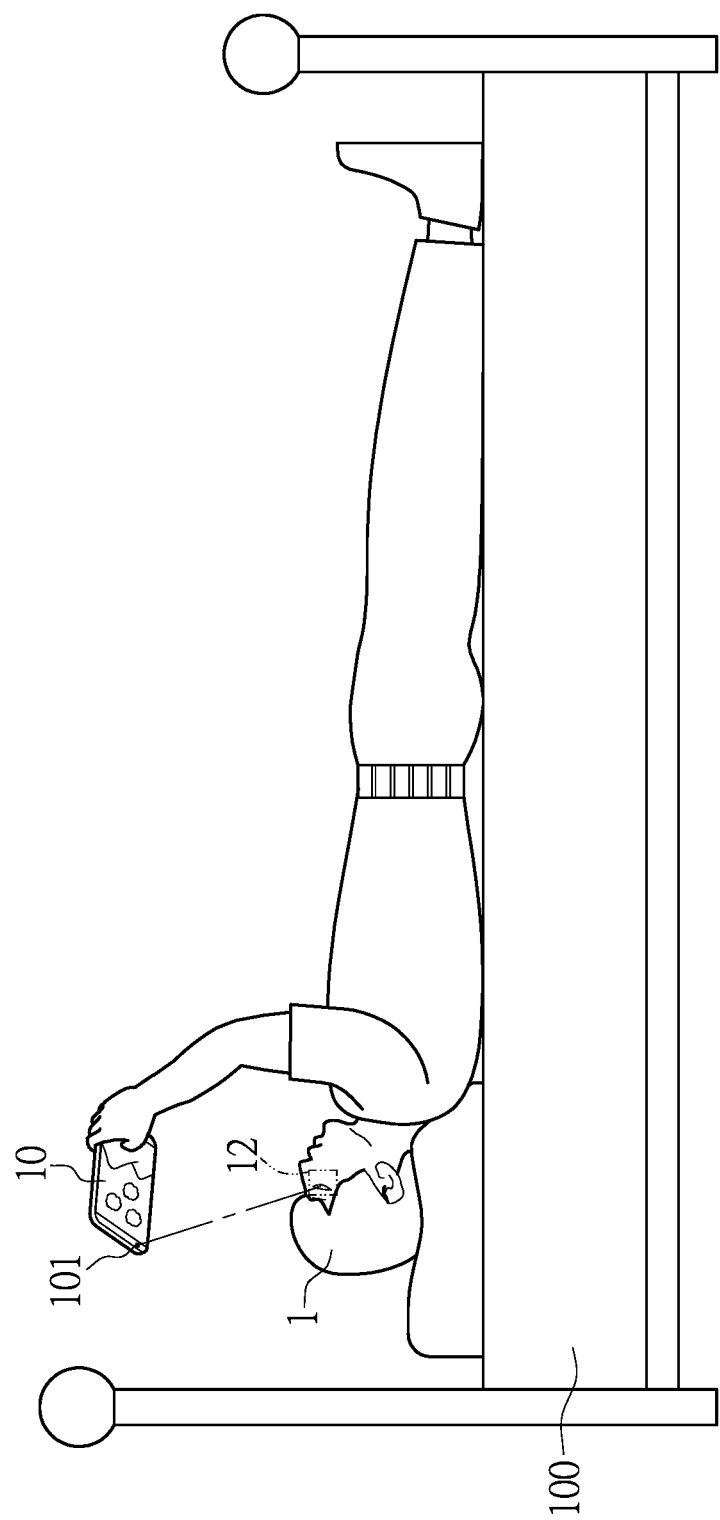
FIG. 2 is another schematic diagram showing another circumstance that a display mode is set for a device according to facial features in another embodiment of the disclosure.

FIG. 2 is a schematic diagram showing a circumstance in the method that particularly uses facial features of the user to set up a display mode of the electronic device.

As mentioned above, in the figure, the user 1 lying in the bed 100 holds the electronic device 10 such as a mobile device. The electronic device 10 includes a camera 101. When the user 1 watches an image displayed on the electronic device 10, the electronic device 10 is activated to perform a software procedure for driving the camera 101 to shoot the user 1. Then facial images can be extracted and the facial organs can be recognized based on the features. For example, the exterior appearance found from the image can be used to position a face, and then the eyes, a nose and a mouth can be recognized based on the features. Referring to the schematic diagram of FIG. 8, eyes 12 can be positioned directly or determined based on other recognized organs. A direction of a line between the eyes 12 can therefore be defined. In one further embodiment, an image processing method can be incorporated to recognize the other objects such as glasses over the face, and the glasses can be referred to for determining the positions of the eyes 12.

In the method for setting the display mode of the electronic device according to the facial features, the above-mentioned technologies can be used to determine the positions of the eyes 12 and also the direction of line between the eyes. The line between the eyes 12 can act as a reference to determine a turning angle of the electronic device 10. In an exemplary example, while the positions of eyes 12 are determined, a relative angle of the eyes 12 watching the display image can be obtained and can also be referred to, as well as referring to a state of the electronic device 10, for generating a turning signal for the electronic device 10 to display the display image. It should be noted that the state of the electronic device 10 displaying the display image includes a portrait mode or a landscape mode of displaying the display image. If the electronic device 10 currently displays the image in a portrait mode, the relative angle indicates an angle between the line between the eyes 12 and a device direction of a long side or a wide side of the electronic device 10.

The mentioned electronic device 10 is preferably a portable device that can be a mobile phone, a tablet computer, a laptop computer, or a head-mounted display. Further, some embodiments of the method can also be applicable to a fixed display device such as a television, a desktop computer or any audio/video (A/V) device that is connected to the television. For example, the A/V device is such as a set top box (STP), a video player or a digital streaming device. The electronic device 10 can also be a display device that includes a built-in or an external camera.

Figure 3:
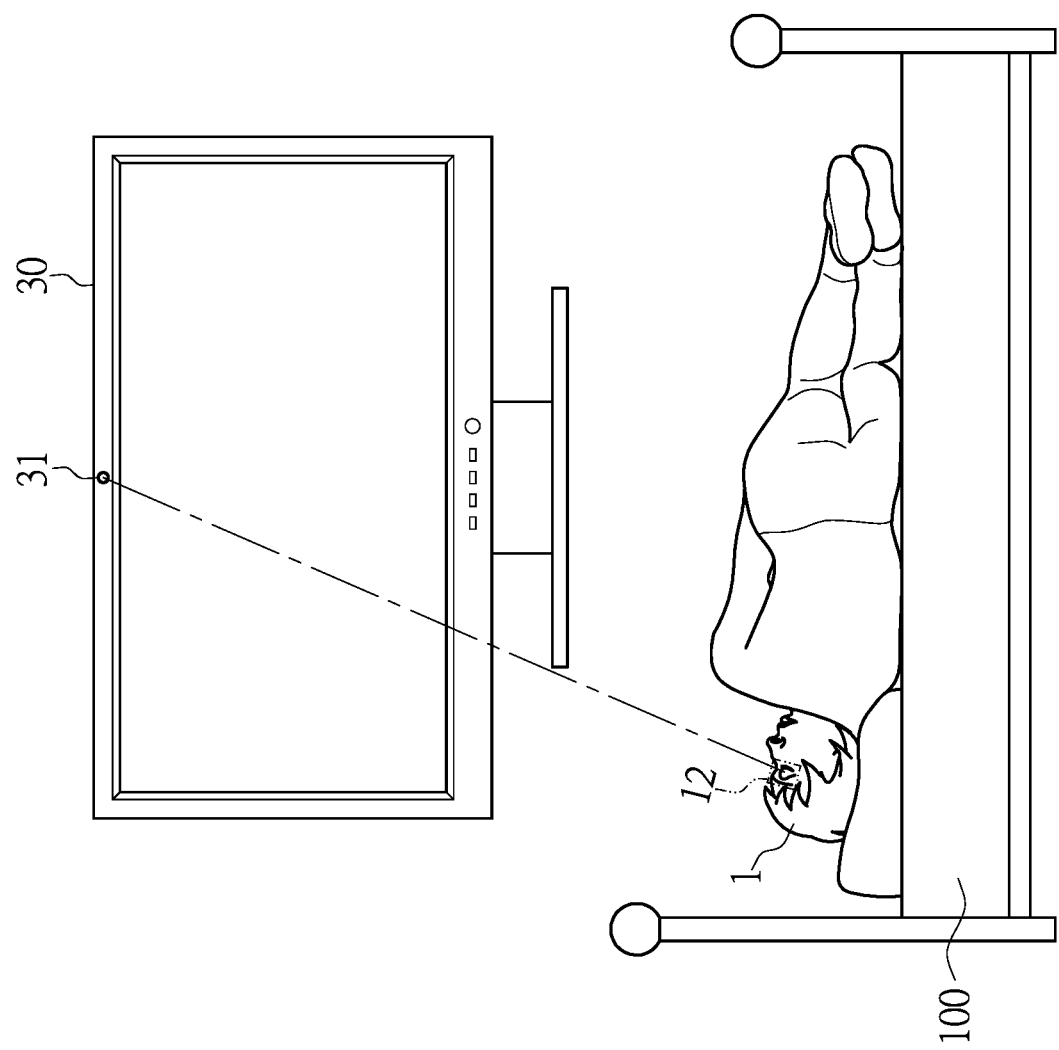
FIG. 3 shows one further schematic diagram of a circumstance that a display mode is set for a device according to facial features in one further embodiment of the disclosure.

For example, reference is made to FIG. 3 showing a schematic diagram of another circumstance that a display mode is set according to facial features. The user 1 also lies in the bed 100 horizontally and watches a fixed electronic device 30, e.g., television. The electronic device 30 has a built-in or an external camera 31.

The camera 31 of the electronic device 30 captures a facial image of the user 1 when the user 1 watches the content displayed on the fixed electronic device 30 in a specific posture. The positions of the eyes 12 can also be determined. The direction of the line between the eyes 12 can be calculated through a software program. A relative angle between the direction of the line and the device direction of the electronic device 30 is obtained. The current example shows that the electronic device 30 is a television with a horizontal device direction.

If the user 1 stands or sits to watch the television, the line direction between the eyes 12 is horizontal. The line between the eyes 12 can also be horizontal even if multiple users watch the television at the same time. The camera 31 is used to capture an image, and the positions of the eyes in the image can be determined when obtaining facial images of each of the users. If the line directions between the eyes of multiple users are the same direction, e.g., along a horizontal direction, the turning angle does not need to be determined since the device direction of the television is also horizontal. However, if the line direction between the eyes of the user 1 in a specific posture is not horizontal, there is a relative angle between the line direction and the device direction. If the relative angle is not larger than a predetermined turning threshold, it is not necessary to turn the electronic device 30. Otherwise, if the relative angle is larger than the turning threshold, a software procedure operated in the electronic device 30 performs the automatic turning function that allows the displayed image to fit a viewing posture of the user 1.

Figure 4:
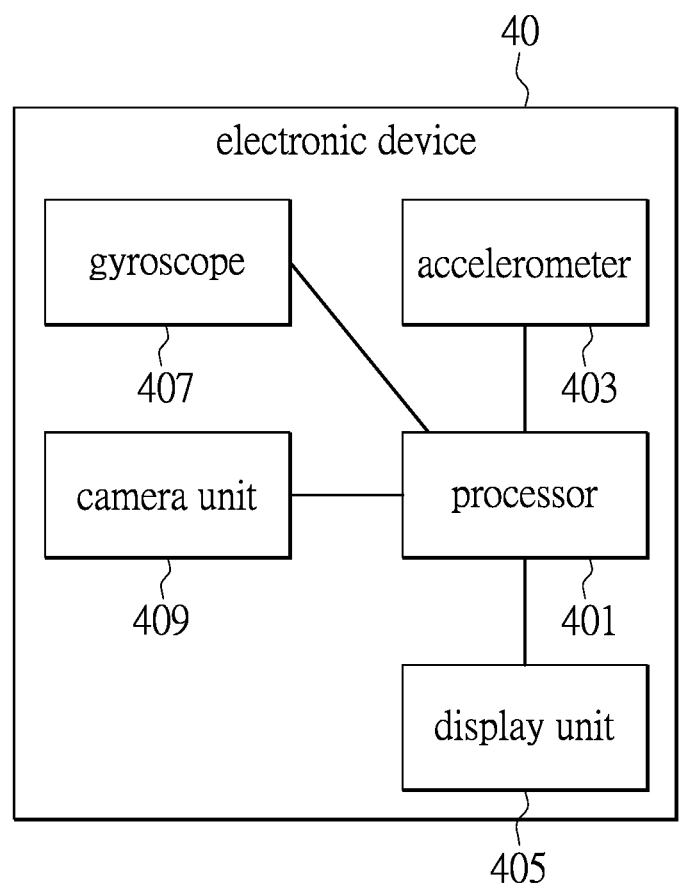
FIG. 4 shows a block diagram depicting the main circuits of an electronic device in one embodiment of disclosure.

FIG. 4 shows a block diagram depicting the main circuit components of the electronic device according to one embodiment of the disclosure.

The electronic device 40 includes a processor 401 and several electronic components electrically connected with the processor 401. The processor 401 performs the software-implemented method for setting display mode of device according to facial features. A display unit 405 is controlled by the processor 401 for generating a display image. After the processor 401 receives the turning signal that indicates a change of the display image, the display unit 405 is driven to control the display image as a landscape mode image or a portrait mode image.

The electronic device 40 includes a camera unit 409. In the method for setting display mode according to facial features, the camera unit 409 continuously captures the facial images of the user. The features of the facial image can be extracted for the purpose of determining the positions of the eyes of the user. The positions of the eyes are provided for the processor 401 to calculate and determine a relative angle of the user's eyes that watches at the display image. A state of the electronic device 40 displaying a present display image is referred to so as to generate a turning signal.

In one embodiment of the disclosure, the state of the display image indicates a state of a landscape mode image or a portrait mode image displayed on the electronic device 40 if the electronic device 40 is a handheld device. Alternatively, the state of the display image indicates a state of displaying the display image in a steady static state if the electronic device 40 is a fixed device.

In one embodiment, the electronic device 40 includes an accelerometer 403 that, according to a gravity direction, determines angles of the device direction of the electronic device 40 in a three-dimensional space and relative to the gravity direction. Further, an orientation of the electronic device 40 can be obtained when cooperated with the gyroscope 407. Both the accelerometer 403 and the gyroscope 407 are used to implement setting the direction of the display image in the method.

Figure 7:
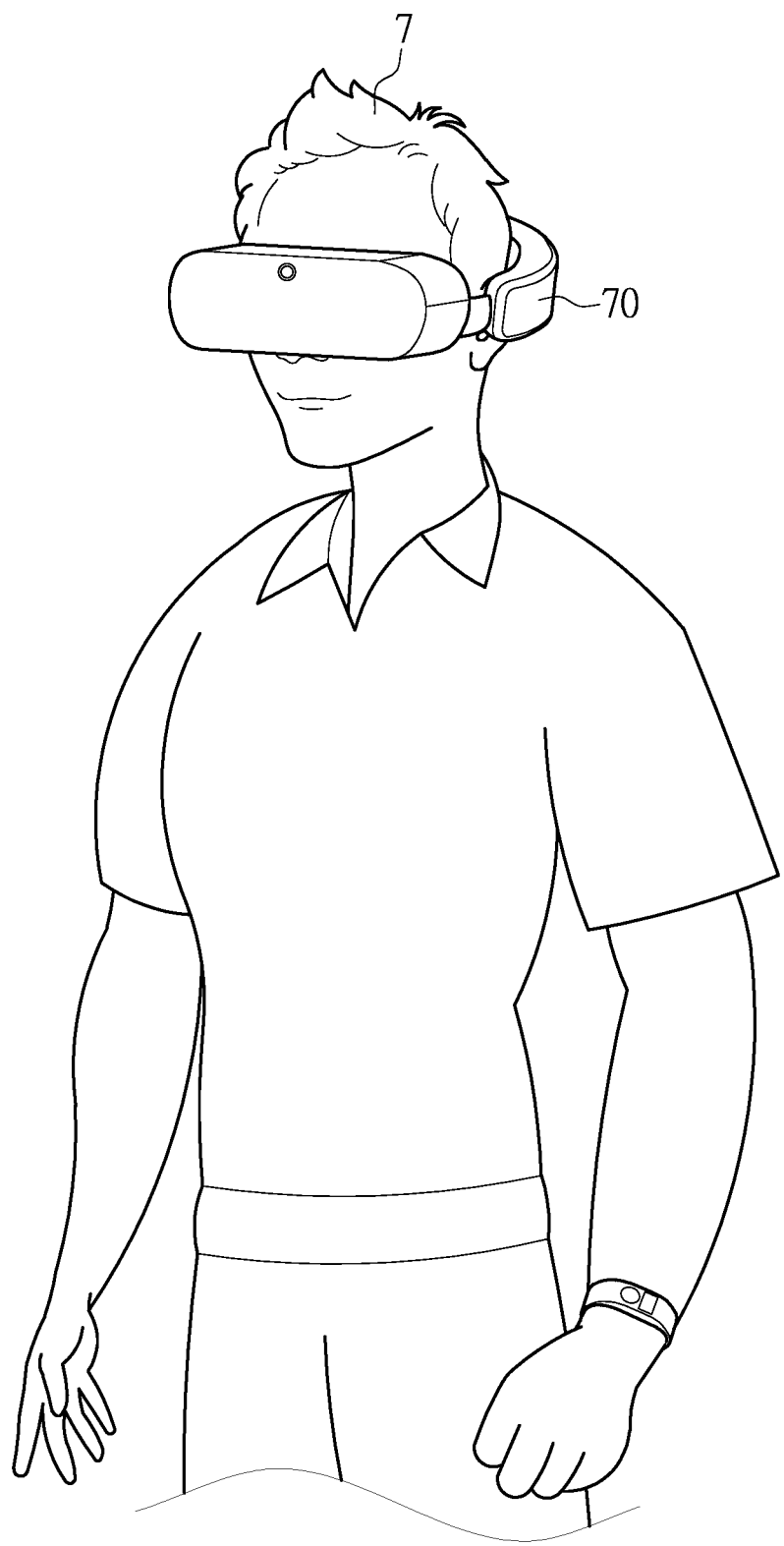
FIG. 7 is a schematic diagram showing a circumstance that a user puts on a head-mounted device as setting display mode of the device according to facial features in one embodiment of the disclosure.

For example, the electronic device 40 can be a head-mounted display (HMD) equipped with an accelerometer 403. Reference is made to FIG. 7, while cooperating with a gyroscope 407, the head-mounted display obtains the relative angle of the user's eyes seeing the display image as the user's head moves. Therefore, the state of the display image can be controlled.

The method for setting display mode according to facial features can be performed in a specific circuit system. For example, the method can be implemented in a processor 401 or a specific integrated circuit of the electronic device 40.

Figure 5:
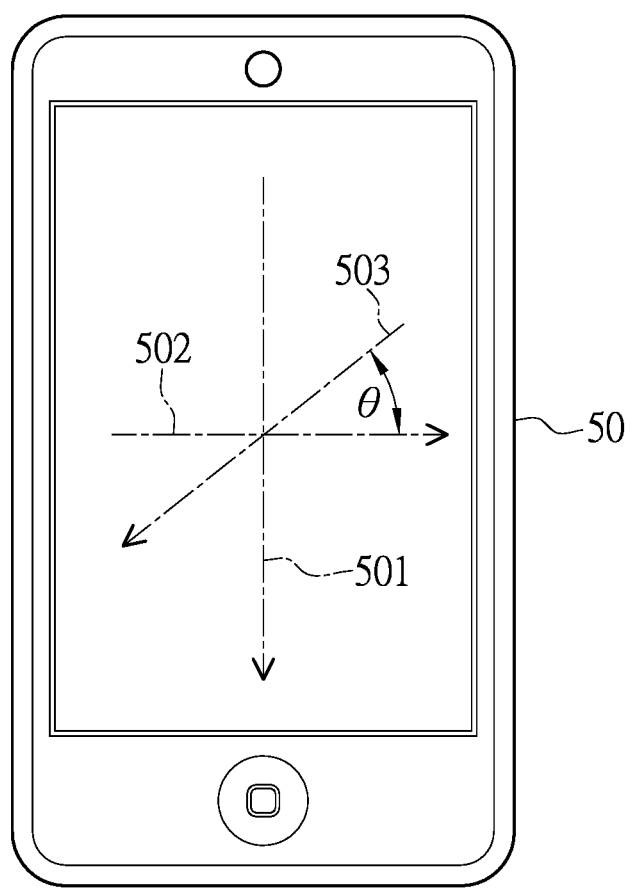
FIG. 5 is a schematic diagram depicting an angular relationship between the electronic device and eyes.

Further, the method primarily provides a turning signal in response to the positions of the user's eyes for setting display mode of the electronic device. Reference is made to FIG. 5, which shows a schematic diagram of the angular relationship between the device direction of the electronic device and the line direction of the eyes.

Several directions can be defined to the electronic device 50 shown in the diagram. In general, the image displayed on the display screen has its own attribute of direction. With an image taken by a camera as an example, the camera provides the attribute of direction when the image is taken. A direction value can be recorded in metadata of the image. Therefore, when the electronic device 50 displays the image, an appropriate way to display the image can be obtained based on an image direction 501 that is compared to the device direction 502 of the electronic device 50. The device direction 502 can be obtained by the accelerometer of the electronic device 50. The figure shows a horizontal device direction 502, however, in practice, the direction is not limited to the present example.

The image displayed on the screen of the electronic device 50 is generally turned according to a spatial angle of the electronic device 50. Instead of the method for driving the electronic device to turn in the conventional technology, the method for deciding the turning angle according to the positions of the eyes is provided in the disclosure.

When the line direction 503 is obtained, the line direction 503 is compared to the device direction 502. Based on a horizontal or a vertical direction, a relative angle θ can be used to determine a way for turning the display image, rather than the conventional way that uses the accelerometer to sense the direction of turning the electronic device.

For example, a user interface can be displayed on a mobile device in a horizontal mode or in a vertical mode. Many applications may also provide a horizontal or a vertical display mode. Alternatively, a software procedure performed in the mobile device may also determine the direction of the image according to an aspect ratio of the image, and then decide the display mode according to the relative angle θ. The image can be separated from its subtitles in some applications, therefore the method can turn the subtitles without changing the direction of the image.

Figure 6:
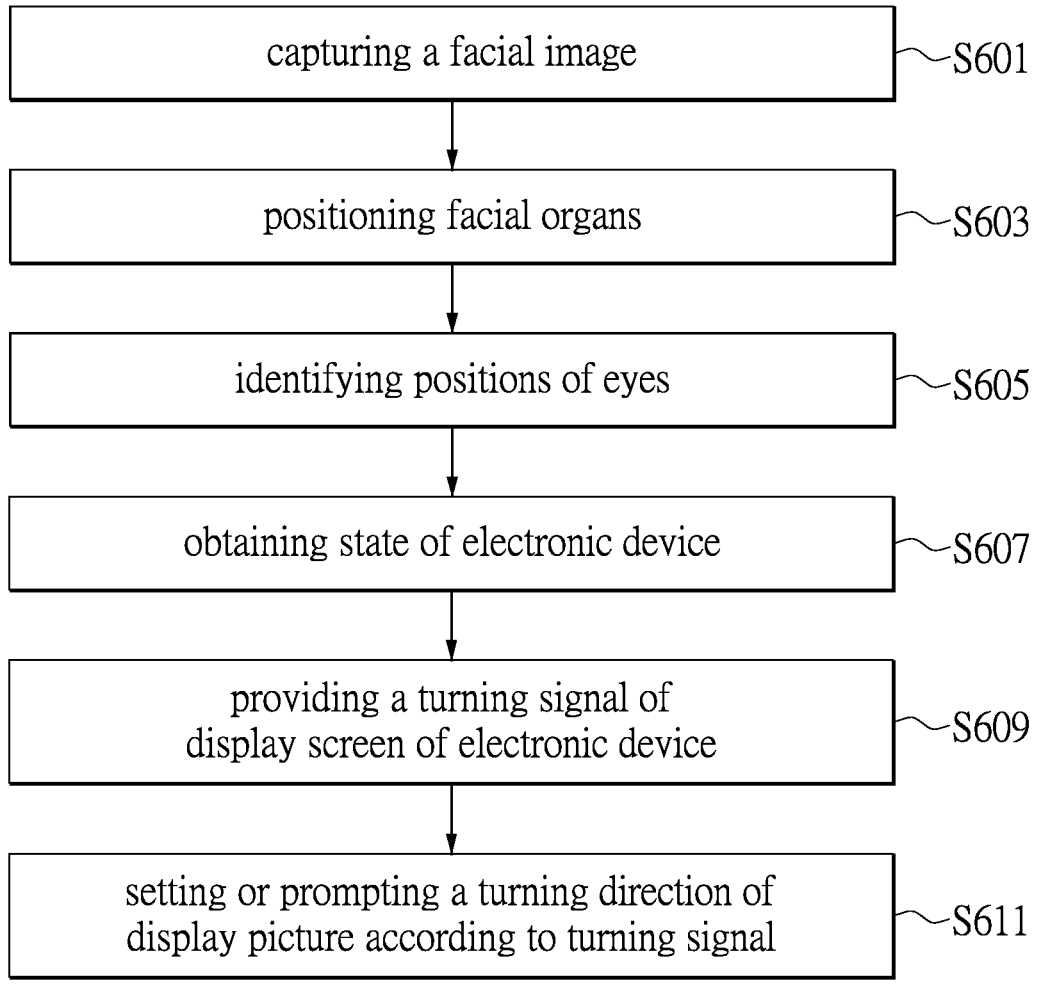
FIG. 6 shows a flow chart describing a method for setting a display mode of a device according to facial features in one embodiment of the disclosure.

FIG. 6 shows a flow chart describing the method for setting display mode according to facial features in one embodiment of the disclosure.

A software procedure running in the electronic device drives a camera to capture at least one facial image of a user (step S601). Facial organs can be positioned based on the facial features with respect to the organs (step S603), and the positions of eyes can be recognized (step S605). The positions of the eyes are used to define a direction of a line between the eyes, and to obtain a relationship with the electronic device. In an exemplary example, the relationship can be depicted by a relative angle between the line between the eyes and the device direction of the electronic device.

In step S607, a software procedure is performed to obtain the state of the display image displayed on the electronic device. In the embodiment, the state of the display image indicates a state of a landscape mode image or a portrait mode image displayed on the electronic device if the electronic device is a handheld device; and the state of the display image indicates a state of displaying the display image under a steady static state if the electronic device is a fixed device.

After obtaining the relative angle between the line direction of the eyes and the device direction, such as in step S609, it is determined whether or not the display image needs to be turned. A turning signal is then generated for driving the electronic device to turn the display image. Afterwards, as in step S611, the turning signal is referred to by the software procedure for setting a direction of the display image, or prompting the user to decide whether or not to turn the display image. In one aspect of the disclosure, before setting the display mode of the display image, a prompting message relating to turning the image is generated and provided for the user to decide whether or not to change the angle of the display image.

FIG. 7 is another schematic diagram showing a circumstance for setting display mode according to facial features in one embodiment of the disclosure.

An application of the method allows a user 7 to put on a head-mounted display 70 to experience virtual reality (VR). The VR images are changed according to the signals generated by sensing circuits such as an accelerometer and a gyroscope of the head-mounted display 70. The method for setting display mode according to facial features in the disclosure provides an appropriate display image in a specific turning angle when the user 7 uses the head-mounted display 70 in a specific posture to watch the image. In one embodiment, the display image may generally turn as the user 7 lies down. However, the method of the disclosure allows the user 7 lying down to see the same image as the user 7 standing up.

In one embodiment of the disclosure, the user 7 sets up an initial image when he starts to operate the head-mounted display 70. Through the method for setting the display mode according to the facial features, a direction of the initial image is unaffected by any of the user's postures, i.e., lying down or others. Therefore, the images can only rely on the user's posture to turn. The program operated in the head-mounted display 70 determines a relative angle that the user 7 sees the display image according to movements of the user's head. The relative angle is provided for the head-mounted display 70 to determine whether or not to turn the display image. For example, a processor of the head-mounted display 70 receives a turning signal, and sets the display mode to be a portrait mode, a landscape mode or a specific mode with a turning angle. The processor then drives a display unit of the head-mounted display 70 to control the display image to be in the portrait mode or the landscape mode.

According to the above-mentioned embodiments, one of the references provided for the electronic device to decide to turn the display image according to the user's posture is the positions of eyes or related information, such as the line direction between the eyes.

Figure 8:
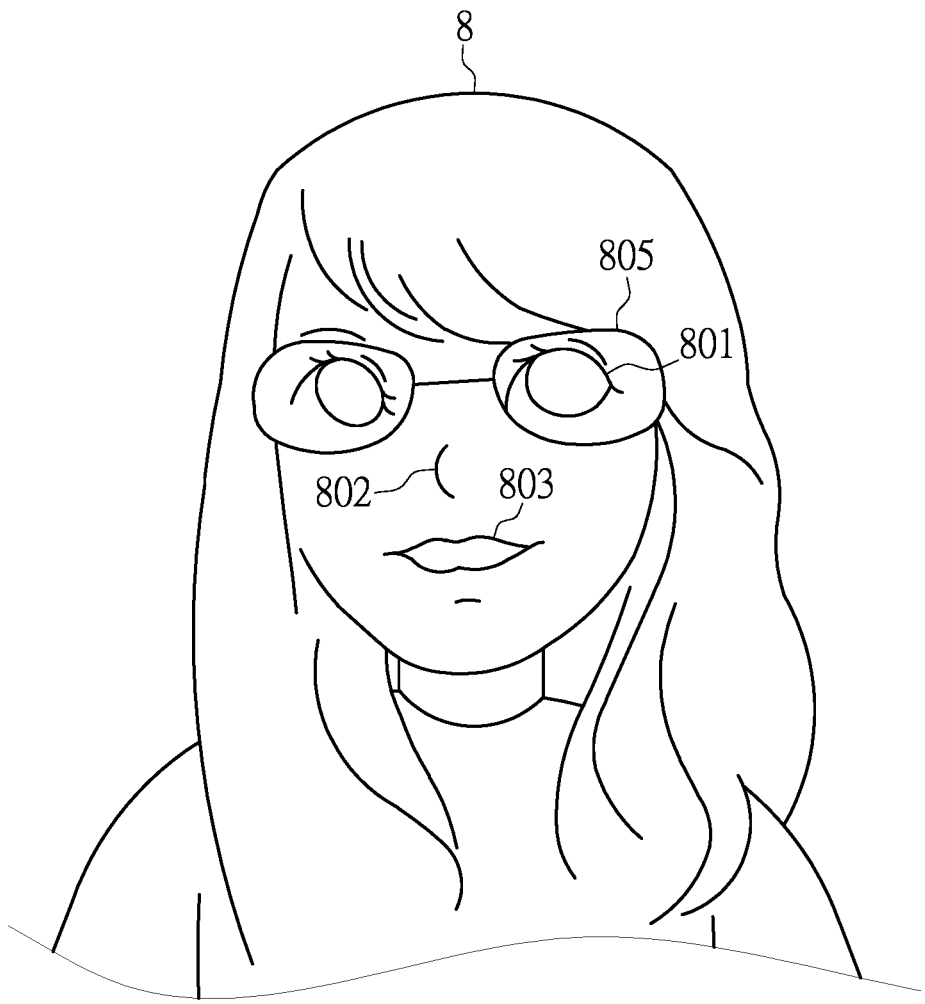
FIG. 8 is a schematic diagram depicting positions of the facial organs.

FIG. 8 schematically shows the facial organs. A software procedure running in the electronic device or a camera captures a facial image from a head 8 of a user. The user's face can be positioned according to a contour of the face. The organs can then be recognized according to the features of the organs, such as eyes 801, glasses 805, a nose 802 and a mouth 803 in the present example. The positions of the organs can be used to identify the positions of the eyes 801. A line direction between the eyes 801 is used to be compared with the device direction (e.g., the horizontal or vertical direction) so as to determine whether or not to turn the display image.

FIG. 9 shows that, when the processor of the electronic device receives the turning signal, a specific mechanism controls a driving mechanism to turn the electronic device to a specific angle, in addition to using the software to change the direction of display image.

In FIG. 9, an electronic device 90 is shown. The electronic device 90 can be a television or a display having a turning mechanism. A camera 905 is disposed in the electronic device 90 for capturing a facial image of the user 9. The software procedure operated in the electronic device 90 then identifies the parts, e.g., the eyes, such that the driving mechanism turns to a specific angle according to direction of a line between the eyes. The diagram shows a first state 901 indicative of a normal position, and a second state 902 indicating a turning angle in accordance with the line between the eyes of the user 9.

In one further aspect of the present disclosure, other than relying on the state of the display image of the electronic device, the above-described method can also be applied to the electronic device or other device without a display for setting a sensor mode of the device according to the facial features. The device includes a sensor that is used to conduct identification of the user. The sensor can be a face-recognition sensor or a fingerprint scanner that generally requires the user in a specific posture in order to perform a sensing function correctly. Therefore, the function of the sensor may be turned off or fail if the user is at a wrong posture. In the method, when a relative angle between a direction the user's face and a device direction of the electronic device is obtained, a turning signal being determined according to the relative angle is referred to for driving the sensor to be functioned correctly under any posture of the user.

In conclusion, the disclosure is related to a method for setting display mode of device according to facial features, and an electronic device implementing the method. A software procedure is operated in the electronic device, and an image processing technology is applied to identify a user's eyes or other organs or features that can be used to identify a viewing angle of the user's eyes. The information of the eyes or the like can be referred to, thereby setting a display mode of the electronic device, e.g., a display. The method that determines the turning of display image of the device according to positions of the eyes solves the shortcoming of the conventional technology that only relies on the direction of gravity to decide a display direction. In specific embodiments, the user may determine to turn off the function of automatic turning through a software program performed in the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for setting a display mode of device according to facial features, comprising:

using a camera built in an electronic device which is a fixed device installed on a fixed position to capture a facial image of the user and positioning facial organs so as to determine positions of two eyes of a user;

calculating a relative angle of viewing a display image being displayed on the electronic device through the two eyes of the user between a direction of a connection between the two eyes and a device direction of the electronic device; and generating, by a processor of the electronic device, a turning signal according to the relative angle with respect to the user's eyes and a state of the display image displayed on the electronic device;

wherein the electronic device is driven by a driving mechanism to turn to a specific angle according to the turning signal, and the state of the display image displayed on the fixed device indicates a state of displaying the display image under a steady static state.

2. The method according to claim 1, wherein the method for setting the display mode of device is performed by the processor of the electronic device and the processor sets up the display mode with respect to the display image after receiving the turning signal.

3. An electronic device that is a fixed device installed on a fixed position and operates a method for setting display mode of device according to facial features, comprising:

a processor;

a display unit being electrically connected with the processor and used to generate a display image; and a camera unit being electrically connected with the processor and used to capture a facial image of a user;

wherein the processor performs the method for setting display mode of device according to the facial features, the method includes:

using the camera unit to capture the facial image of the user and positioning facial organs so as to determine positions of two eyes of a user;

calculating a relative angle of viewing the display image being displayed on the electronic device through the two eyes of the user between a direction of a connection between the two eyes and a device direction of the electronic device; and generating, by the processor, a turning signal according to the relative angle with respect to the user's eyes and a state of the display image displayed on the electronic device;

wherein the electronic device is driven by a driving mechanism to turn to a specific angle when the processor receives the turning signal, and the state of the display image displayed on the fixed device indicates a state of displaying the display image under a steady static state.

\* \* \* \* \*